Figure 1:
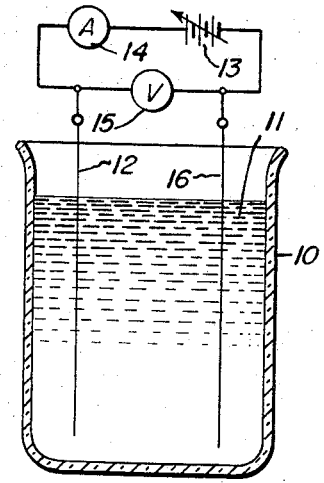

April 16, 1968  D. A. VERMILYEA  3,378,471
ANODIZED TANTALUM AND NIOBIUM AND METHOD OF
FORMING AN OXIDE COATING THEREON
Filed June 17, 1965

Inventor:
David A. Vermilyea,
by Richard G. Speer
His Attorney.

United States Patent Office 3,378,471
Patented Apr. 16, 1968

3,378,471
ANODIZED TANTALUM AND NIOBIUM AND METHOD OF FORMING AN OXIDE COATING THEREON
David A. Vermilyea, Schenectady, N.Y., assignor to General Electric Company, a corporation of New York
Filed June 17, 1965, Ser. No. 464,758
2 Claims. (Cl. 204—56)

This invention relates to processes for the formation of oxide dielectric films on bodies composed of niobium, tantalum and alloys of these metals with each other and more particularly to a new anodizing solution and method for forming such films.

Modern electrolytic capacitors are commonly made by simultaneously winding a plurality of elongated strips of metal foil, at least one of which has an oxide covered surface, and correspondingly dimensioned and shaped strips of gauze into a cylindrically shaped coil, the gauze acting as a separator between adjacent layers of the foil. In these capacitors, the oxide film acts as a dielectric while the gauze is saturated or impregnated with a suitable electrolyte. The composite coil is enclosed within a suitably closed receptacle which acts to prevent drying of the electrolyte.

The failures caused by oxide film breakdown have been particularly troublesome in the manufacture of capacitors constructed with foils made of tantalum, niobium or alloys of these two metals. The oxide film on the metal foil, which constitutes the dielectric, is to a large extent that portion of a capacitor which determines its effectiveness. Oxide films of non-uniform thickness and those having large numbers of flaw sites frequently result in substandard capacitor performance.

Many and diverse factors affect the nature and quality of the oxide films formed on the various metals used in constructing capacitors and one of the more important factors is the electrolytic or anodizing solution in which the oxide film is created. As a general matter, films less than 100 A. thick are relatively insensitive to variations in formation procedure, but for thicker films the nature of the electrolytic solution used is very important. This fact probably obtains due to the incorporation of substances from the anodizing solution into the oxide film, this being an occurrence that is fully documented.

It is a principal object of this invention to provide an electrolytic or anodizing solution for use in the production of improved dielectric oxide films on bodies constructed of niobium, tantalum or alloys of these metals with each other.

A further object of this invention is to provide an improved process for producing improved dielectric oxide films on bodies constructed of niobium, tantalum or alloys of these metals with each other.

Other objects and advantages of this invention will be in part obvious and in part explained by reference to the accompanying specification and drawings.

Figure 2:
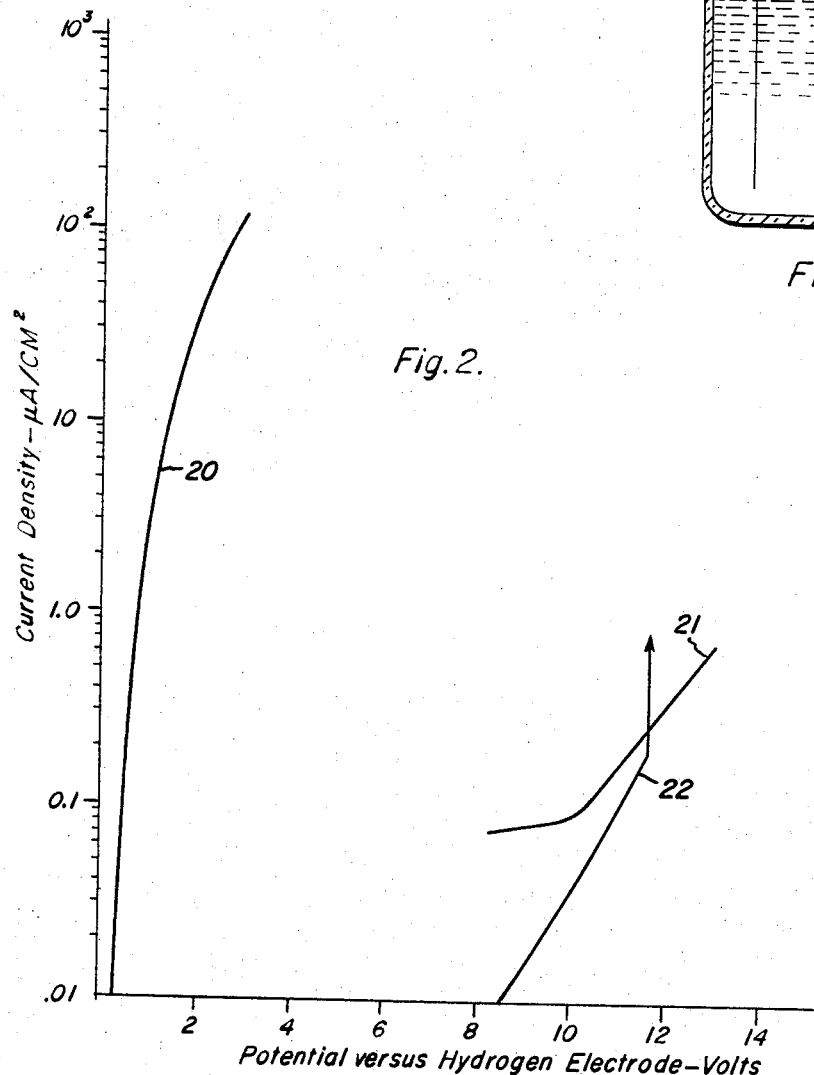

FIG. 1 is a partially schematic view showing the manner in which anodization is effected; and FIG. 2 is a graph showing electrical properties of films formed in accordance with this invention, as compared to a film formed in a standard anodizing solution.

Comprehensively, the electrolytic anodizing solution of this invention comprises an aqueous solution containing an ionizable substance to make the solution electrically conducting and also containing hydrogen peroxide. The process comprises immersing the bodies to be oxidized in a solution of the type mentioned above, electrically connecting the bodies to an electrode which is also immersed in the solution and then applying an electric potential to the bodies in a way rendering them anodic and thereby causing the formation of dielectric oxide films of superior properties.

Considering the electrolytic anodizing solution in more detail, it is an aqueous solution preferably of dilute concentration which contains a small amount of some substance which ionizes and thereby renders the solution electrically conductive. Any ionizing substance can be used so long as it does not change the character of the solution in a way that would cause it to be capable of dissolving the anodized film being formed on the metal rendered anodic. For example, substances such as potassium hydroxide, nitric acid, potassium chloride, sulfuric acid and perchloric acid have all been used as the ionizing substance in aqueous solution and found to be acceptable. Thus, substances representative of three broad categories of materials—acids, bases and salts, have been tested and determined to be acceptable. Conversely, it should be pointed out that a solution of an acid such as hydrofluoric acid will dissolve tantalum and niobium oxide films and would therefore not be of value as an ingredient in an anodizing solution. The solubility of these oxides in various solutions can be determined simply by referring to appropriate technical literature.

It was previously indicated that the ion-containing aqueous solution is preferably a dilute one, that is, one containing a comparatively small percentage of the ionizing substance. As a general rule, the percentage of ionizing material present would not exceed 10 percent and in most cases not exceed 3 to 4 percent. On the other hand, percentages as low as 0.1 percent of ionizing substance have been found to be completely effective. The function of the ionizing substance is, of course, to render the solution electrically conducting and only that percentage necessary to keep the current resistance low in the anodizing cell is of any value. Higher percentages are not only unnecessarily expensive but may also give rise to some film contamination which could otherwise be avoided.

The most important addition to the anodizing solution and one which prior to this invention has never been made in the preparation of electrical solutions used to develop dielectric oxide films on bodies of tantalum, niobium or alloys thereof, is hydrogen peroxide. Here, once again, the amount of this material present in the solution can vary within wide extremes. It can work effectively in concentrations as high as 30 percent and also in amounts as low as 0.01 percent or even lower. As a usual matter, amounts ranging from just enough to be effective up to 30 percent are used, with additions of 0.1 to 3 percent constituting the great bulk of the quantities added to the anodizing solution. It is probable that in some manner some portion of the hydrogen peroxide is incorporated into the metal oxide film and by this action forms a dielectric oxide having properties significantly superior to those obtained through the use of existing anodizing solutions and methods.

The anodizing of a body composed of niobium, tantalum or some alloy thereof can best be explained by reference to FIGURE 1 of the drawings. In this figure, which is somewhat diagrammatic, the numeral 10 indicates a common glass beaker within which is contained a quantity of anodizing solution 11. Supported within this solution is a cathode 12 which may be of any material that is substantially inert with respect to the anodizing solution and the anode 16 which is, of course, the body upon which the oxide film is to be produced. The anode and cathode are connected to a source 13 of variable direct current, the connection being made so that the anode 16 is connected to the negative pole and the cathode 12 to the positive pole of the direct current source. The circuit also includes an ammeter 14 and a voltmeter 15 to provide for adequate control of the anodizing conditions.

Several specimens were prepared in solutions prepared according to this invention and according to the method of the invention and these samples were tested for back-current leakage to determine the dielectric efficacy of the oxide film thus formed. The evaluations of the dielectric properties were made by immersing the anodized samples in standard solutions of 0.1 mole cerium sulfate solution. The specimens were made cathodic with respect to a platinum anode in the test solution and a voltage current curve then determined. Curves 20, 21 and 22 in FIG. 2 of the drawings indicate the relationship between the negative potential applied to the oxide coated specimens and the amount of current which flowed through the film. The specimen resulting in curve 20 was anodized in a solution of 1 percent nitric acid with the application of 28 volts, while the specimens for curves 21 and 22 were anodized with the application of 28 volts in 1 percent nitric acid solutions which contained 3 percent hydrogen peroxide and 0.1 percent hydrogen peroxide, respectively. In all cases, the peroxide added was standard 3 percent (volumetric) hydrogen peroxide solution. It can readily be seen that the specimen anodized in the absence of any hydrogen peroxide required only about $-0.25$ volt before leakage of current began to take place and that by the time a voltage of $-1.0$ was applied, the leakage had increased to a current density of about 3.0 microamps per square centimeter. With the application of $-2$ volts, the leakage was up to about 50 microamps per square centimeter.

Comparing the current density leakages of this sample with those obtained on the samples resulting in curves 21 and 22, it can be seen that the leakage on these samples which were treated with the peroxide would not reach 0.1 microamp per square centimeter until voltages ranging from about $-9\frac{1}{2}$ to $-10\frac{1}{2}$ had been reached. It can further be noted from these two curves that the difference in the percentage of hydrogen peroxide present in the solution had comparatively little effect upon the dielectric properties of the oxide films.

Other samples were prepared in various solutions and these samples tested in the same manner outlined above. The nature of the forming solution and the voltages required before a leakage of 0.1 microamp per square centimeter took place are contained in the following table.

Table I

| Forming solution somposition: | Voltage for 0.1 $\mu a./cm.^2$ leakage |
|---|---|
| (1) 0.1% KOH | 1.85 |
| (2) 1% $HNO_3$ | 2.16 |
| (3) 1% $HNO_3$+30% $H_2O_2$ | 11.5 |
| (4) 1% $HNO_3$+3% $H_2O_2$ | 11.5 |
| (5) 1% $HNO_3$+0.015% $H_2O_2$ | 9.9 |
| (6) 0.1% KOH+0.1% $H_2O_2$ | 8.3 |
| (7) 4% KOH+2% $H_2O_2$ | 11.5 |
| (8) 0.1% KCl+3% $H_2O_2$ | 9.9 |
| (9) 1% $H_2SO_4$+3% $H_2O_2$ | 8.4 |

A review of this table clearly indicates that the values obtained for specimens numbered 1 and 2, which were obtained without the use of hydrogen peroxide, had significantly poorer properties than those of samples 3 through 9 which were anodized in the presence of the various concentrations of peroxide indicated.

Although the present invention has been described in connection with preferred embodiments, it is to be understood that modifications and variations may be resorted to without departing from the spirit and scope of the invention, as those skilled in the art will readily understand. Such modifications and variations are considered to be within the purview and scope of the invention and the appended claims.

What I claim as new and desire to secure by Letters Patent of the United States is:

1. A process for producing a dielectric oxide film on a body of a metal selected from the group consisting of tantalum, niobium and alloys thereof comprising immersing the body in an aqueous solution of an ionizable substance imparting electrical conductivity to the solution, which solution also contains hydrogen peroxide dissolved therein, electrically connecting the body to an electrode which is also immersed in the solution, and applying an electric potential to the body in a manner rendering it anodic and thereby causing the formation of a dielectric oxide film on the surface thereof.

2. An anodized body of a metal selected from the group consisting of tantalum, niobium and alloys thereof produced by immersing the metal body in an aqueous solution of an ionizable substance imparting electrical conductivity to the solution, which solution also contains hydrogen peroxide dissolved therein, electrically connecting the body to an electrode which is also immersed in the solution, and applying an electric potential to the body in a manner rendering it anodic and thereby causing formation of a dielectric oxide film on the surface of said body.

References Cited

UNITED STATES PATENTS

| 692,139 | 1/1902 | Hulin | 23—207 |
| 1,128,966 | 2/1915 | Fischer | 204—84 |
| 1,398,468 | 11/1921 | Schumacher | 23—207 |
| 2,909,470 | 10/1959 | Schmidt | 204—56 XR |
| 2,932,153 | 4/1960 | Bernard et al. | 204—58 |
| 3,336,112 | 8/1967 | Hooper | 23—207 |

HOWARD S. WILLIAMS, *Primary Examiner.*

G. KAPLAN, *Assistant Examiner.*